United States Patent
Kobayashi (10) Patent No.: US 12,428,053 B2
(45) Date of Patent: Sep. 30, 2025

(54) STEERING ASSISTANCE CONTROL APPARATUS

(71) Applicant: SUBARU CORPORATION, Tokyo (JP)

(72) Inventor: Natsumi Kobayashi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 1042 days.

(21) Appl. No.: 17/402,999

(22) Filed: Aug. 16, 2021

(65) Prior Publication Data

US 2022/0063717 A1    Mar. 3, 2022

(30) Foreign Application Priority Data

Aug. 27, 2020    (JP) ................. 2020-143738

(51) Int. Cl.
*B62D 6/00* (2006.01)
*B62D 5/04* (2006.01)

(52) U.S. Cl.
CPC ............. *B62D 6/00* (2013.01); *B62D 5/0463* (2013.01)

(58) Field of Classification Search
CPC ........ D62D 6/00; B62D 5/0463; B62D 6/008; B62D 6/006; B62D 6/00
See application file for complete search history.

(56) References Cited

U.S. PATENT DOCUMENTS

| | | |
|---|---|---|
| 5,072,803 A | 12/1991 | Kilian et al. |
| 7,136,732 B2 * | 11/2006 | Shimizu ............... B62D 5/0463 |
| | | 701/41 |
| 2008/0021612 A1 * | 1/2008 | Sakuma ................. B62D 5/008 |
| | | 701/41 |
| 2011/0022270 A1 * | 1/2011 | Tamaizumi .............. B62D 6/04 |
| | | 701/41 |
| 2015/0025744 A1 * | 1/2015 | Banno ...................... B62D 6/04 |
| | | 701/41 |
| 2017/0005463 A1 | 1/2017 | Michishita et al. |
| 2018/0284758 A1 * | 10/2018 | Cella ......................... H04L 1/18 |
| 2021/0114653 A1 * | 4/2021 | Tsubaki ............... B62D 5/0409 |

FOREIGN PATENT DOCUMENTS

| | | | |
|---|---|---|---|
| JP | 2007022169 A | * | 2/2007 |
| JP | 2017-17827 A | | 1/2017 |
| JP | 2017-65473 A | | 4/2017 |
| JP | 2020-15349 A | | 1/2020 |

OTHER PUBLICATIONS

English translation of JP-2007022169-A (Year: 2007).*
Notice of Reasons for Refusal issued in Japanese Patent Application No. 2020-143738 dated Dec. 4, 2023, with machine translation.

* cited by examiner

*Primary Examiner* — Donald J Wallace
(74) *Attorney, Agent, or Firm* — TROUTMAN PEPPER LOCKE LLP (57) ABSTRACT

A steering assistance control apparatus to be applied to a vehicle includes a detection unit and a correction unit. The detection unit is configured to detect a road surface cant of a road on which the vehicle is traveling. The correction unit is configured to correct steering target torque in a steering control system, on the basis of a steering characteristic value for each of left steering and right steering and the road surface cant detected by the detection unit. The steering characteristic value indicates a steering characteristic for each combination of a traveling speed and the road surface cant.

13 Claims, 4 Drawing Sheets

STEERING ASSISTANCE CONTROL APPARATUS

CROSS-REFERENCE TO RELATED APPLICATION

The present application claims priority from Japanese Patent Application No. 2020-143738 filed on Aug. 27, 2020, the entire contents of which are hereby incorporated by reference.

BACKGROUND

The technology relates to a steering assistance control apparatus mountable on a vehicle.

Various techniques have been proposed for driving assistance control of a vehicle, such as an automobile. For example, reference may be made to Japanese Unexamined Patent Application Publication No. 2017-65473.

SUMMARY

An aspect of the technology provides a steering assistance control apparatus to be applied to a vehicle. The steering assistance control apparatus includes a detection unit and a correction unit. The detection unit is configured to detect a road surface cant of a road on which the vehicle is traveling. The correction unit is configured to correct steering target torque in a steering control system, on the basis of a steering characteristic value for each of left steering and right steering and the road surface cant detected by the detection unit. The steering characteristic value indicates a steering characteristic for each combination of a traveling speed and the road surface cant.

An aspect of the technology provides a steering assistance control apparatus to be applied to a vehicle. The steering assistance control apparatus includes circuitry. The circuitry is configured to detect a road surface cant of a road on which the vehicle is traveling. The circuitry is further configured to correct steering target torque in a steering control system, on the basis of a steering characteristic value for each of left steering and right steering and the detected road surface cant. The steering characteristic value indicates a steering characteristic for each combination of a traveling speed and the road surface cant.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the technology.

DETAILED DESCRIPTION

A left-right difference is caused in a steering system of a vehicle by variations in shapes, for example, of parts to be assembled in manufacture and aging, such as wear, of the assembled parts. The left-right difference is a difference in characteristic between left and right. Therefore, even if steering is performed with the same steering torque in a left direction and a right direction by steering assistance control, a difference occurs between left turning performance and right turning performance of the vehicle in some cases.

Such a difference in the turning performance of the vehicle can give a feeling of strangeness to an occupant, such as a driver, which can impair comfort and a feeling of security of driving assistance control and automatic driving.

It is desirable to reduce an occupant's feeling of strangeness about a left-right difference in steering assistance control.

Some example embodiments of the technology are described below with reference to FIGS. 1 to 5. Note that the following description is directed to illustrative examples of the disclosure and not to be construed as limiting to the technology. Each configuration illustrated in the drawings referred to in the following description is partial extraction of a configuration of the example embodiment, and is modifiable in a variety of ways in accordance with a design or any other factor as long as the modification does not depart from the technical idea of the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a ratio between the elements, and relative positional relationship between the elements are illustrative only and not to be construed as limiting the technology. Further, elements in the following example embodiments which are not recited in a most-generic independent claim of the disclosure are optional and may be provided on an as-needed basis.

Configurations once described may be denoted with the same numerals to avoid any redundant description. Moreover, embodiments of the technology are not limited to those described below and encompass modifications, alternations, etc. in a range that allows for achievement of what may be desired by the embodiments of the technology.

As steering directions of a steering wheel in the following description, steering in a counterclockwise direction as seen from a driver is referred to as left steering, and steering in a clockwise direction as seen from the driver is referred to as right steering.

In the following description, a value related to left steering on the steering wheel is expressed by a value of 0 (zero) or more and a value related to right steering on the steering wheel is expressed by a value of less than 0 (zero), in regard to a value of a vehicle yaw rate [deg/s], a value of driver input torque [Nm], a value of electric power steering systems (EPS) output torque [Nm], a value of assistance torque [Nm], a value of steering target torque [Nm], and a value of corrected steering target torque [Nm].

In regard to a value of a road surface cant [deg], a value indicating that the left side as seen from a vehicle is lower is expressed by a value of 0 (zero) or more, and a value indicating that the right side as seen from the vehicle is lower is expressed by a value of less than 0 (zero).

Meanings of torques in the example embodiments are as follows.

The driver input torque refers to torque to be inputted by the driver's operation on the steering wheel.

The assistance torque refers to torque to be added in response to the driver's operation on the steering wheel.

The steering target torque refers to an EPS output torque instruction value to be set to cause the vehicle to turn on the basis of steering assistance control.

The EPS output torque refers to the sum of the assistance torque and the steering target torque.

Left-right difference correction torque refers to a value to be used to correct the steering target torque on the basis of a traveling speed, a road surface cant, and a steering characteristic value.

The corrected steering target torque refers to an EPS output torque instruction value to be set to cause the vehicle to turn on the basis of the steering assistance control, as with the steering target torque. The corrected steering target torque is obtained by correcting the steering target torque on the basis of the left-right difference correction torque.

A configuration of a vehicle-mounted system 1 according to one example embodiment of the technology is described below with reference to FIG. 1.

The vehicle-mounted system 1 may include a steering assistance control apparatus 10, an imaging device 11L, an imaging device 11R, a vehicle speed sensor 15, a yaw rate sensor 16, a steering wheel rotation angle sensor 17, a torsion bar torque sensor 18, an electric motor rotation angle sensor 19, a memory 20, and a steering mechanism 30.

The steering assistance control apparatus 10 may be configured as an electronic control unit (ECU), and may include a traveling environment recognizing unit 12, an arithmetic processing unit 13, and a steering unit 14.

Thus, the example embodiment describes an example in which the steering assistance control apparatus 10 including the traveling environment recognizing unit 12, the arithmetic processing unit 13, and the steering unit 14 is configured as one ECU. In another example, some or all of the traveling environment recognizing unit 12, the arithmetic processing unit 13, and the steering unit 14 may be configured as ECUs different from each other. In this case, at least one embodiment of the technology may be implemented by the ECUs performing processing in parallel with each other.

In one embodiment, the traveling environment recognizing unit 12 and the arithmetic processing unit 13 may serve as a "detection unit". In one embodiment, the arithmetic processing unit 13 may serve as a "correction unit".

To the steering assistance control apparatus 10 may be coupled the imaging devices 11L and 11R, the vehicle speed sensor 15, the yaw rate sensor 16, the steering wheel rotation angle sensor 17, the torsion bar torque sensor 18, and the electric motor rotation angle sensor 19. The imaging devices 11L and 11R may be installed in the own vehicle to capture images in a traveling direction of the vehicle, e.g., a front-ward direction. The vehicle speed sensor 15 may detect the traveling speed. The yaw rate sensor 16 may detect the vehicle yaw rate. The steering wheel rotation angle sensor 17 may detect a steering wheel angle. The torsion bar torque sensor 18 may detect the driver input torque. The electric motor rotation angle sensor 19 may detect a rotation angle of a rotor of an electric motor 42 to be described later.

The steering assistance control apparatus 10 may be configured to receive detection signals obtained by these sensors.

The imaging devices 11L and 11R may be disposed, for example, near an upper part of a front windshield of the own vehicle. The imaging devices 11L and 11R may be spaced from each other by a predetermined distance in a vehicle width direction to measure distances by a so-called stereo method. The imaging devices 11L and 11R may have optical axes parallel to each other and the same focal length as each other. The imaging devices 11L and 11R may also have frame periods synchronized with each other and the same frame rate as each other.

An electrical signal, or a captured image signal, obtained by an image sensor of each of the imaging devices 11L and 11R may be subjected to analog-to-digital (A/D) conversion into a digital image signal, or captured image data. The captured image data may indicate, in units of pixels, a luminance value corresponding to a predetermined gray-scale.

The traveling environment recognizing unit 12 may store, in internal memory, pieces of frame image data serving as the captured image data obtained by the imaging devices 11L and 11R capturing images in front of the own vehicle. On the basis of two pieces, i.e., a pair, of captured image data serving as each frame, the traveling environment recognizing unit 12 may execute various processes for recognition of an object present in front of the own vehicle as an external environment. For example, the traveling environment recognizing unit 12 may recognize a lane line provided on a road, and a three-dimensional object, such as a preceding vehicle or an obstacle. The lane line may be a line defining traveling lanes, such as a white line or an orange line. The traveling environment recognizing unit 12 may also estimate a traveling path of the own vehicle (hereinafter also referred to as an "own vehicle traveling path"), on the basis of information on the detected lane line.

In recognizing the three-dimensional object ahead of the own vehicle, the traveling environment recognizing unit 12 may perform a process on a pair of captured image data, i.e., a stereo image, obtained by the imaging devices 11L and 11R. The process may involve obtaining distance information from an amount of shift between corresponding positions on the basis of the principle of triangulation. The traveling environment recognizing unit 12 may generate, on the basis of the distance information, data indicating three-dimensional distance distribution, i.e., a distance image. Thereafter, the traveling environment recognizing unit 12 may perform, on the basis of the data, known grouping and comparison with pre-stored data, such as data on a three-dimensional road shape or data on a three-dimensional object. The traveling environment recognizing unit 12 may thereby extract, for example, data on a lane line, data on a sidewall, such as a guardrail or a curb, present along a road, and data on a three-dimensional object, such as a vehicle.

The data on the three-dimensional object may include a distance from the own vehicle to the three-dimensional object, and a temporal change in the distance, i.e., a relative speed with respect to the own vehicle. From the data on the three-dimensional object, a vehicle that is closest to the own vehicle on the own vehicle traveling path and travels at a predetermined speed in substantially the same direction as the own vehicle may be extracted as a preceding vehicle. The predetermined speed may be, for example, 0 km/h or more. Among the preceding vehicles, a vehicle with a speed of substantially 0 km/h may be recognized as a stopped preceding vehicle.

An image recognition result of the preceding vehicle, the three-dimensional object, and the lane line, for example, obtained by the traveling environment recognizing unit 12 may be used for various types of driving assistance control, such as steering assistance control.

In relation to the steering assistance control according to the example embodiment, for example, information on the detected lane line and information on the preceding vehicle may be inputted to the arithmetic processing unit 13. Examples of the information on the detected lane line may include information on the own vehicle traveling path.

The arithmetic processing unit 13 may perform control for various types of driving assistance, on the basis of input information indicating the image recognition result obtained by the traveling environment recognizing unit 12.

The arithmetic processing unit 13 may be configured to perform the steering assistance control, or steering control, by setting the steering target torque on the basis of, for example, a lane line ahead of the own vehicle. Examples of the steering assistance control may include lane keep control, e.g., active lane keep (ALK), and lane departure prevention control. The lane keep control may keep the own vehicle in the middle of the own vehicle traveling path. The lane departure prevention control may prevent departure from the own vehicle traveling path, i.e., departure of the own vehicle from a lane of the own vehicle traveling path.

The arithmetic processing unit 13 may also be configured to perform, as driving assistance control related to steering, follow-up steering control of causing a lateral position of the own vehicle to follow that of the preceding vehicle.

The arithmetic processing unit 13 may determine an activation condition for each of various types of steering assistance control, and execute the steering assistance control in a case where the activation condition is satisfied. Whether the steering assistance control is activatable may be determined on the basis of, for example, operation information SD on the driver, information from the traveling environment recognizing unit 12, and information from the sensors. The operation information SD on the driver may collectively indicate operation information such as on/off operations on an adaptive cruise control (ACC) switch and a steering assistance control execution switch.

The arithmetic processing unit 13 calculates, for each combination of the traveling speed and the road surface cant, the steering characteristic value indicating a steering characteristic for each of left steering and right steering. The steering characteristic value may indicate, as the steering characteristic, a degree to which the vehicle turns in response to steering. Examples of the steering characteristic value may include the vehicle yaw rate with respect to steering torque.

The arithmetic processing unit 13 may calculate the steering characteristic value while the own vehicle is traveling, regardless of execution/non-execution of the various types of steering assistance control. A method of calculating the steering characteristic value will be described in detail later.

The arithmetic processing unit 13 may cause the memory 20 to record data indicating correlation between the traveling speed, the road surface cant, and the steering characteristic value. The memory 20 may include, for example, a random access memory (RAM), a flash memory, or a hard disk drive (HDD).

In the steering assistance control, the arithmetic processing unit 13 corrects the steering target torque in a steering control system, on the basis of the steering characteristic value for each of left steering and right steering, to calculate the corrected steering target torque. A method of calculating the corrected steering target torque will be described in detail later.

The arithmetic processing unit 13 may output the corrected steering target torque to the steering unit 14.

The steering unit 14 may include a microcomputer. The steering unit 14 may control the electric motor 42 on the basis of the corrected steering target torque from the arithmetic processing unit 13. The steering unit 14 may also execute power steering control of assisting steering by the driver.

The steering mechanism 30 to be subjected to the steering control may be configured as follows, for example.

The steering mechanism 30 may include a steering shaft 32 rotatably supported by an unillustrated vehicle body frame via a steering column 33. The steering shaft 32 may have one end extending toward a driver's seat and the other end extending toward an engine room. A steering wheel 34 may be attached to the one end of the steering shaft 32. A pinion shaft 35 may be coupled to the other end of the steering shaft 32.

The engine room may have a steering gear box 36 extending in the vehicle width direction. The steering gear box 36 may support a rack shaft 37 inserted therein to allow the rack shaft 37 to reciprocate. The rack shaft 37 may be provided with an unillustrated rack between its ends. An unillustrated pinion provided on the pinion shaft 35 may be in engagement with the rack to configure a rack-and-pinion steering gear mechanism.

Left and right ends of the rack shaft 37 may protrude from the steering gear box 36, and a front knuckle 39 may be coupled to each of the ends via a tie rod 38. The front knuckle 39 may pivotably support corresponding one of left and right wheels 40L and 40R serving as wheels to be steered, and may be steerably supported by the vehicle body frame via an unillustrated kingpin. With this configuration, when the steering wheel 34 is operated to rotate the steering shaft 32 and the pinion shaft 35, the rotation of the pinion shaft 35 may move the rack shaft 37 in a left-right direction. The movement of the rack shaft 37 may cause the front knuckles 39 to pivot about the respective unillustrated kingpins to steer the left and right wheels 40L and 40R in the left-right direction.

The electric motor 42 may be coupled to the pinion shaft 35 via an assist transmission mechanism 41. The electric motor 42 may allow for addition of the assistance torque for the driver input torque to be applied to the steering wheel 34 and the steering target torque based on the steering assistance control. The steering target torque may include the corrected steering target torque.

Figure 2:
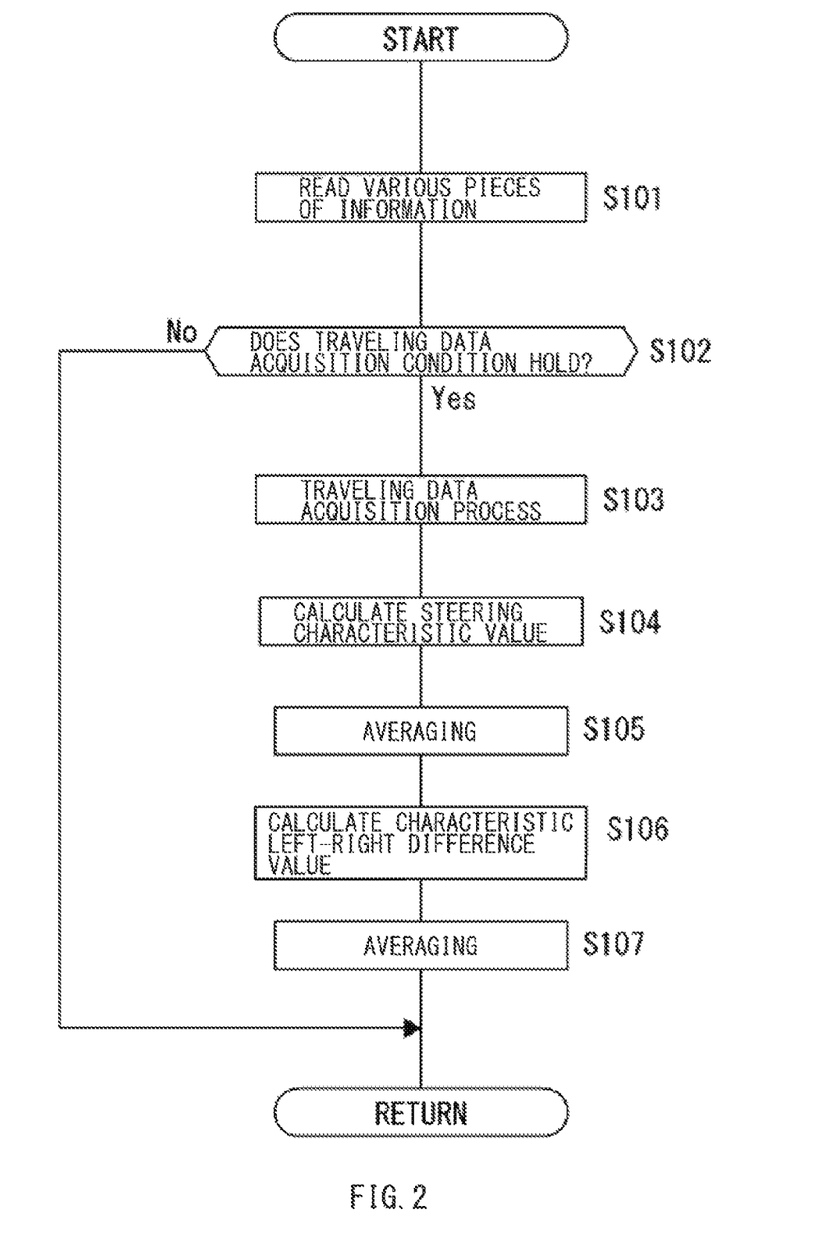
FIG. 2 is a flowchart illustrating a map data generation process to be executed by a steering assistance control apparatus according to one example embodiment.

Description is given below on an example of a map data generation process to be executed by the steering assistance control apparatus 10 according to the example embodiment, with reference to FIG. 2 to FIG. 4. The steering assistance control apparatus 10 may execute a process illustrated in FIG. 2 while the own vehicle is traveling, regardless of an activation state of the various types of steering assistance control. By executing the process illustrated in FIG. 2, the steering assistance control apparatus 10 may generate three-dimensional map data to be used to correct the steering target torque during the steering assistance control.

The steering assistance control apparatus 10 may first, in step S101, execute reading of various pieces of information.

For example, the steering assistance control apparatus 10 may read the traveling speed of the own vehicle detected from the vehicle speed sensor 15.

Thereafter, the steering assistance control apparatus 10 may, in step S102, determine whether a traveling data acquisition condition holds. For example, the steering assistance control apparatus 10 may determine whether the traveling data acquisition condition holds on the basis of the traveling speed of the own vehicle.

In this case, the steering assistance control apparatus 10 may, for example, set 40 km/h as a predetermined threshold, and determine that the traveling data acquisition condition holds if the traveling speed is 40 km/h or more. One reason for this is that traveling data acquired in a case where the traveling speed is too low is a steering characteristic value not suitable as data for correction of the steering target torque. The traveling data may hereinafter also be referred to as "traveling information".

In another example, the steering assistance control apparatus 10 may determine whether the traveling data acquisition condition holds on the basis of a steering wheel angular velocity. In this case, the steering assistance control apparatus 10 may, for example, set 60 deg/s as a predetermined threshold, and determine that the traveling data acquisition condition holds if the steering wheel angular velocity is 60 deg/s or less. One reason for this is that traveling data acquired in a case where steering is performed on the steering wheel such that the steering wheel angular velocity exceeds 60 deg/s is a steering characteristic value not suitable as data for correction of the steering target torque.

In another example, the steering assistance control apparatus 10 may determine whether the traveling data acquisition condition holds on the basis of both the traveling speed of the own vehicle and the steering wheel angular velocity. In this case, the steering assistance control apparatus 10 may, for example, determine that the traveling data acquisition condition holds in a case where the traveling speed of the own vehicle is 40 km/h or more and where the steering wheel angular velocity is 60 deg/s or less.

Upon determining that the traveling data acquisition condition does not hold in step S102 (S102: No), the steering assistance control apparatus 10 may cause the process to return to step S101, without performing processes of steps S103 to S107 to be described later. The steering assistance control apparatus 10 may subsequently execute similar processes.

Upon determining that the traveling data acquisition condition holds in step S102 (S102: Yes), the steering assistance control apparatus 10 may cause the process to proceed to step S103.

The steering assistance control apparatus 10 may execute a traveling data acquisition process in step S103. For example, the steering assistance control apparatus 10 may acquire the traveling speed detected from the vehicle speed sensor 15, the vehicle yaw rate detected from the yaw rate sensor 16, and the driver input torque detected from the torsion bar torque sensor 18.

The steering assistance control apparatus 10 may also acquire the input information indicating the image recognition result obtained by the traveling environment recognizing unit 12.

Thereafter, the steering assistance control apparatus 10 may calculate the steering characteristic value in step S104.

The steering characteristic value may be calculated by substituting the vehicle yaw rate, the driver input torque, and the EPS output torque into [Expression 1] given below. The EPS output torque is the sum of the assistance torque and the steering target torque.

(steering characteristic value [(deg/s)/Nm])=(vehicle yaw rate [deg/s])/{(driver input torque [Nm])+ (EPS output torque [Nm])}   [Expression 1]

Figure 1:
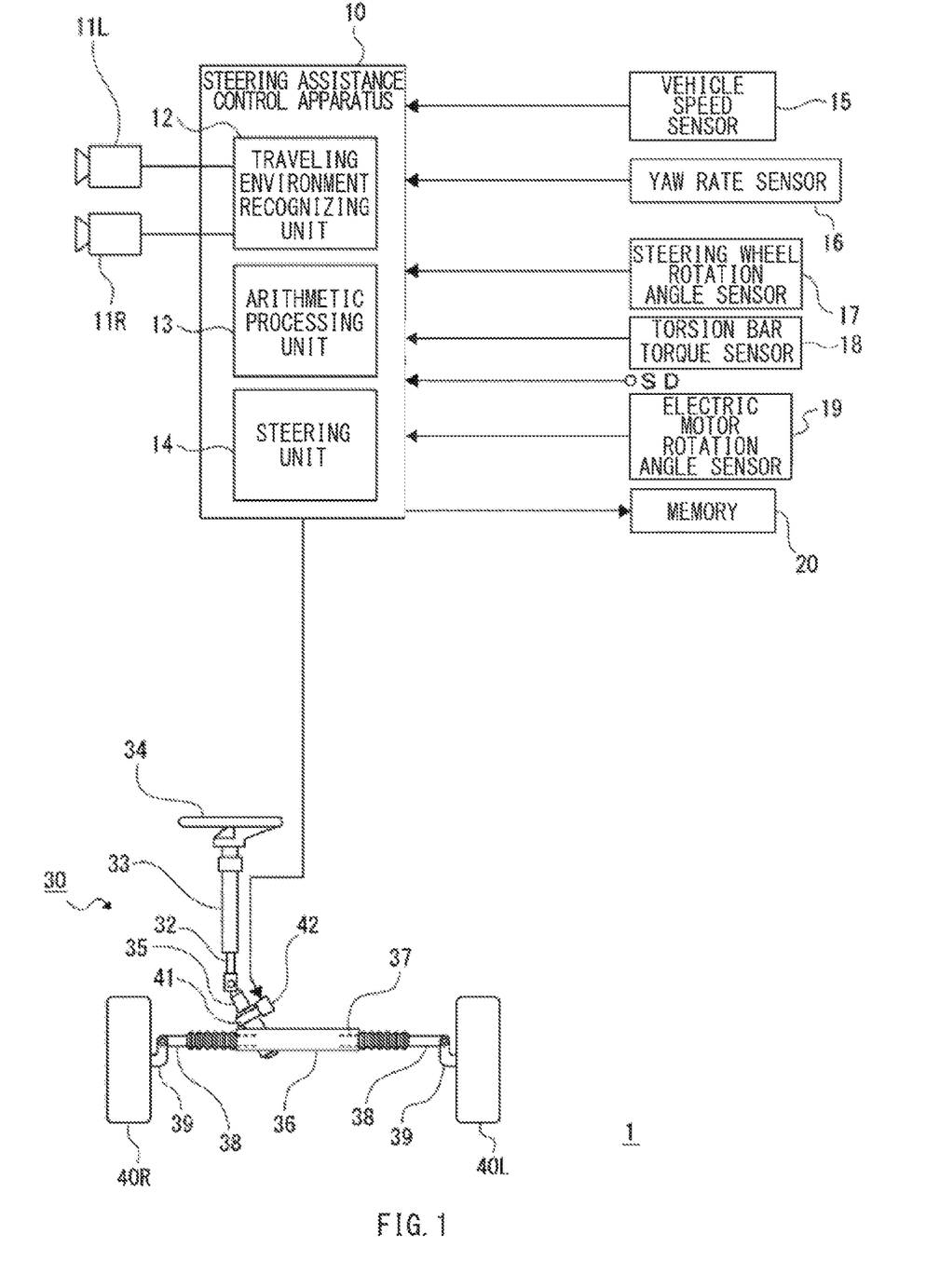
FIG. 1 is a diagram illustrating a configuration of a vehicle-mounted system according to one example embodiment of the technology.

Thus adding the EPS output torque as well as the driver input torque makes it possible to calculate the steering characteristic value in consideration of all torques to be inputted to the pinion shaft 35 illustrated in FIG. 1. It is possible for the steering assistance control apparatus 10 to calculate the steering characteristic value, regardless of a difference in the driver input torque between drivers and the activation state of the various types of steering assistance control.

Accumulating the steering characteristic value regardless of activation/non-activation of the steering assistance control makes it possible to correct the steering target torque to minimize influence of a change in the steering characteristic value due to alignment adjustment and part replacement.

In the following description, the steering characteristic value calculated on the basis of left steering is referred to as a "left steering characteristic value", and the steering characteristic value calculated on the basis of right steering is referred to as a "right steering characteristic value", if these steering characteristic values are to be distinguished from each other.

The steering assistance control apparatus 10 may calculate the road surface cant on the basis of the input information indicating the image recognition result obtained by the traveling environment recognizing unit 12. The road surface cant may be calculated by any of various existing methods. For example, the steering assistance control apparatus 10 may calculate the road surface cant on the basis of an unillustrated acceleration sensor provided in the vehicle.

The steering assistance control apparatus 10 may cause the memory 20 to record correlation between the steering characteristic value, the traveling speed, and the road surface cant. For example, the steering assistance control apparatus 10 may cause the memory 20 to record the correlation in regard to a preset, predetermined distance traveled by the own vehicle in the past. In this case, the steering characteristic value may be a value calculated on the basis of the traveling information within the predetermined distance traveled by the own vehicle in the past.

Figure 3:
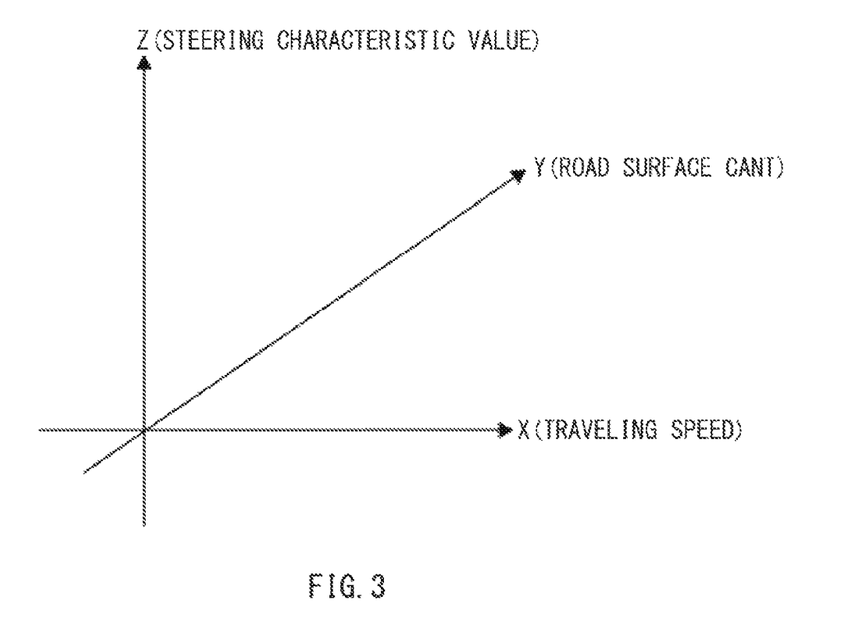
FIG. 3 is a conceptual diagram illustrating three-dimensional map data indicating correlation between a traveling speed, a road surface cant, and a steering characteristic value according to one example embodiment.

The steering assistance control apparatus 10 may cause the correlation between the steering characteristic value, the traveling speed, and the road surface cant to be recorded by, for example, generating three-dimensional map data in which the X axis indicates the traveling speed, the Y axis indicates the road surface cant, and the Z axis indicates the steering characteristic value as illustrated in FIG. 3.

In this case, the steering assistance control apparatus 10 may generate the three-dimensional map data for the correlation for each of the left steering characteristic value and the right steering characteristic value.

The steering assistance control apparatus 10 may, in step S105, perform averaging for the three-dimensional map data for each of the left steering characteristic value and the right steering characteristic value. The averaging may be performed by, for example, a method of leveling time-series data, such as a moving average method. For example, any of simple moving average, weighted moving average, and exponential moving average may be used. To remove value variations serving as noise, filtering may be performed by setting any threshold.

Thereafter, the steering assistance control apparatus 10 may, in step S106, calculate a characteristic left-right difference value indicating ease with which the vehicle turns in the left-right direction in response to steering.

The steering assistance control apparatus 10 may acquire, on the basis of the three-dimensional map data of FIG. 3 subjected to the averaging, the left steering characteristic value and the right steering characteristic value for each combination of the traveling speed and the road surface cant.

The steering assistance control apparatus 10 may calculate the characteristic left-right difference value for each combination of the traveling speed and the road surface cant, by substituting the acquired left steering characteristic value and right steering characteristic value into [Expression 2] given below.

(characteristic left-right difference value [(deg/s)/
Nm])=(left steering characteristic value [(deg/s)/
Nm])−(right steering characteristic value [(deg/
s)/Nm])  [Expression 2]

A case where the characteristic left-right difference value is 0 (zero) or more indicates that the vehicle yaw rate caused by left steering is larger than the vehicle yaw rate caused by right steering. This indicates a state in which, if the same steering torque is inputted for left and right by the driver or the steering assistance control, it is more difficult for the vehicle to turn in the right direction than in the left direction.

A case where the characteristic left-right difference value is less than 0 (zero) indicates that the vehicle yaw rate caused by right steering is larger than the vehicle yaw rate caused by left steering. This indicates a state in which, if the same steering torque is inputted for left and right by the driver or the steering assistance control, it is more difficult for the vehicle to turn in the left direction than in the right direction.

The steering assistance control apparatus 10 may cause the memory 20 to store correlation between the characteristic left-right difference value, the traveling speed, and the road surface cant.

Figure 4:
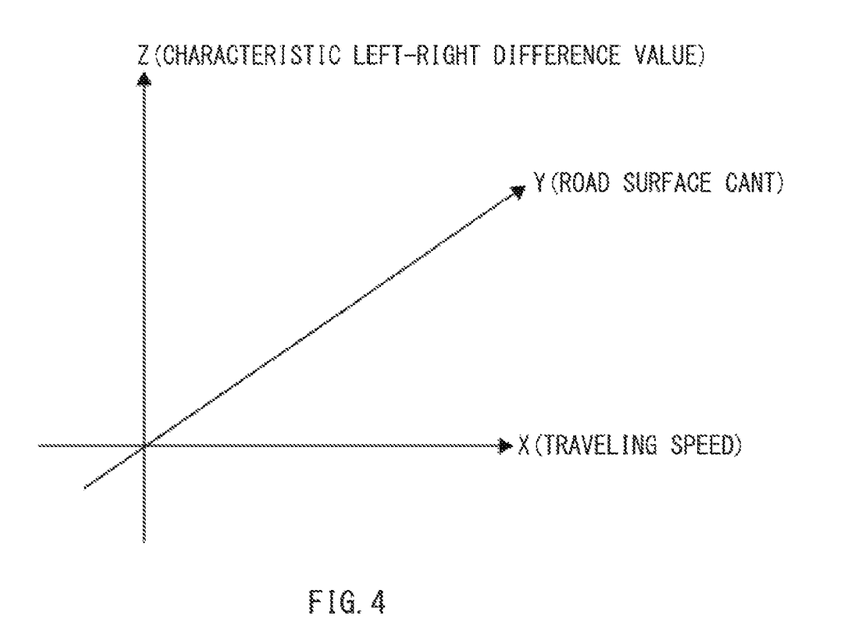
FIG. 4 is a conceptual diagram illustrating three-dimensional map data indicating correlation between the traveling speed, the road surface cant, and a characteristic left-right difference value according to one example embodiment.

The steering assistance control apparatus 10 may cause the correlation between the characteristic left-right difference value, the traveling speed, and the road surface cant to be recorded by, for example, generating three-dimensional map data in which the X axis indicates the traveling speed, the Y axis indicates the road surface cant, and the Z axis indicates the characteristic left-right difference value as illustrated in FIG. 4.

The steering assistance control apparatus 10 may, in step S107, perform averaging for the three-dimensional map data illustrated in FIG. 4. The averaging may be performed by a method similar to the method described above.

After executing the process of step S107, the steering assistance control apparatus 10 may cause the process to return to step S101, and subsequently repeatedly execute similar processes while the vehicle is traveling.

This enables generation of the three-dimensional map data, illustrated in FIG. 3 and FIG. 4, to be used to correct the steering target torque.

Figure 5:
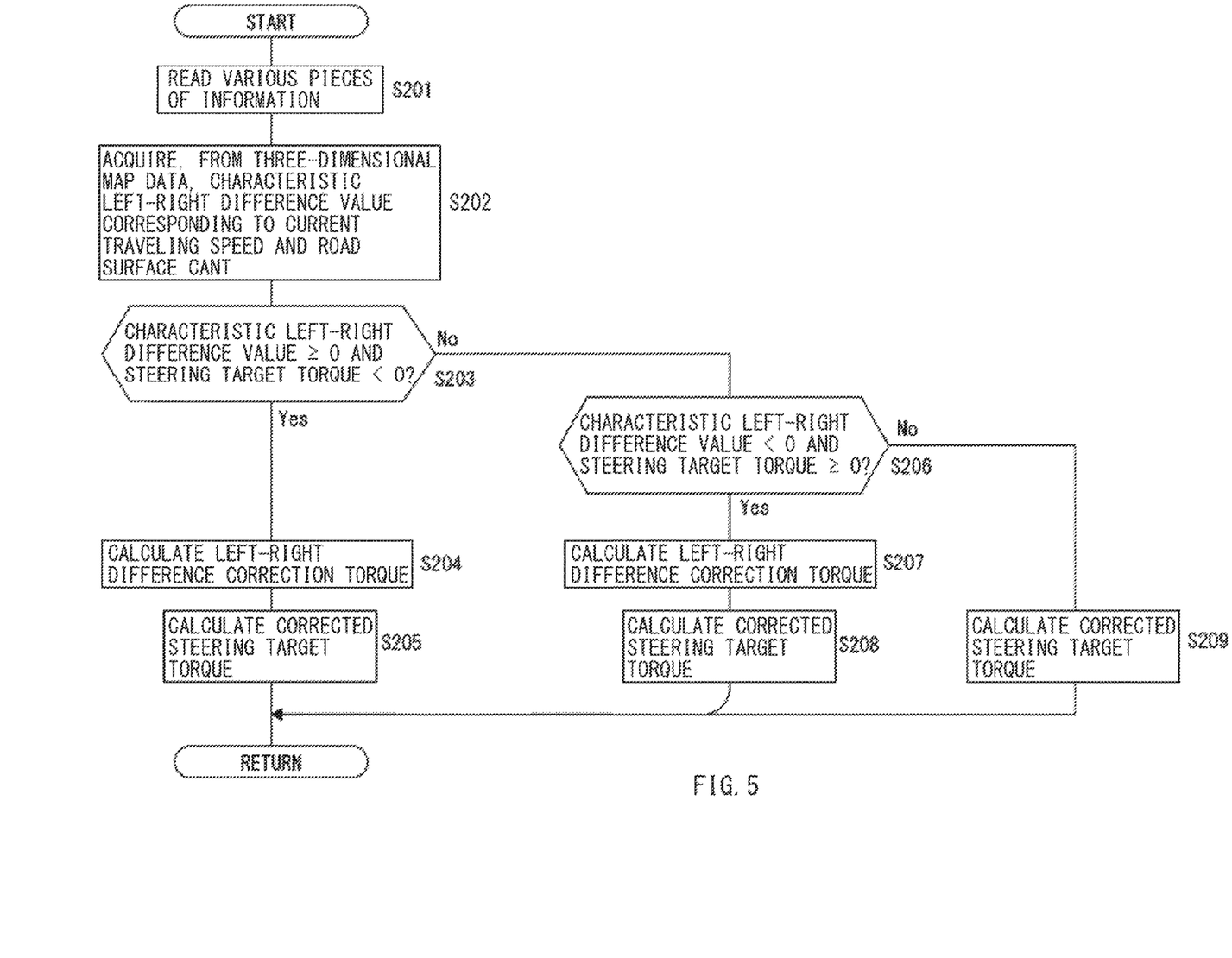
FIG. 5 is a flowchart illustrating a steering target torque correction process to be executed by the steering assistance control apparatus according to one example embodiment.

Description is given next on an example of a steering target torque correction process to be executed by the steering assistance control apparatus 10 according to the example embodiment, with reference to FIG. 5. The steering assistance control apparatus 10 may execute the process illustrated in FIG. 5, for example, while the steering assistance control is working. Examples of the steering assistance control may include lane keep control, e.g., active lane keep, of keeping the own vehicle in the middle of the own vehicle traveling path, and lane departure prevention control of preventing departure from the own vehicle traveling path.

The steering assistance control apparatus 10 may first, in step S201, execute reading of various pieces of information. For example, the steering assistance control apparatus 10 may read the traveling speed of the own vehicle detected from the vehicle speed sensor 15 and the driver input torque detected from the torsion bar torque sensor 18.

The steering assistance control apparatus 10 may also convert an effective value of the electric motor into the EPS output torque.

Note that the steering assistance control apparatus 10 may acquire a torque output value by, for example, converting an effective value of motor startup current into torque, or may acquire the torque output value by communication via a controller area network (CAN).

The steering assistance control apparatus 10 may also acquire the input information indicating the image recognition result obtained by the traveling environment recognizing unit 12 to be used to calculate the road surface cant.

Thereafter, the steering assistance control apparatus 10 may, in step S202, calculate the road surface cant on the basis of the input information indicating the image recognition result obtained by the traveling environment recognizing unit 12.

The steering assistance control apparatus 10 may acquire, from the three-dimensional map data illustrated in FIG. 4, the characteristic left-right difference value corresponding to the current traveling speed and road surface cant.

The steering assistance control apparatus 10 may, in step S203, determine whether a condition that "the characteristic left-right difference value is 0 (zero) or more and the steering target torque is less than 0 (zero)" is satisfied at the current traveling speed and road surface cant.

"The characteristic left-right difference value being 0 (zero) or more" indicates a state in which, in a case where the same steering torque is inputted for left and right, it is more difficult for the traveling vehicle to turn in the right direction than in the left direction. "The steering target torque being less than 0 (zero)" indicates a state in which the steering assistance control is working to cause the vehicle to turn in the right direction.

This means that a state in which the condition of "the characteristic left-right difference value is 0 (zero) or more and the steering target torque is less than 0 (zero)" is satisfied is a state in which it is difficult for a turning path of the vehicle in the right direction based on the steering assistance control to reach a turning path of the vehicle assumed by the steering assistance control apparatus 10.

If the condition of "the characteristic left-right difference value is 0 (zero) or more and the steering target torque is less than 0 (zero)" is satisfied in step S203 (S203: Yes), the steering assistance control apparatus 10 may cause the process to proceed to step S204.

The steering assistance control apparatus 10 may, in step S204, calculate the left-right difference correction torque for correction of the steering target torque.

The steering assistance control apparatus 10 may acquire, from the three-dimensional map data illustrated in FIG. 3, the left steering characteristic value and the right steering characteristic value at the current traveling speed and road surface cant.

The steering assistance control apparatus 10 may calculate a left-right difference correction factor by substituting the acquired left steering characteristic value and right steering characteristic value into [Expression 3] given below.

(left-right difference correction factor)=(left steering
characteristic value [(deg/s)/Nm])/(right steering
characteristic value [(deg/s)/Nm])  [Expression 3]

Thereafter, the steering assistance control apparatus 10 may calculate the left-right difference correction torque. The steering assistance control apparatus 10 may calculate the left-right difference correction torque by substituting values of the calculated left-right difference correction factor and the current driver input torque, assistance torque, and steering target torque into [Expression 4] given below.

(left-right difference correction torque [Nm])={(left-right difference correction factor)−1}×{(driver input torque [Nm])+(assistance torque [Nm])+(steering target torque [Nm])}  [Expression 4]

The steering assistance control apparatus 10 may execute range limiting of comparing, for example, the absolute value of the left-right difference correction torque with a preset limit value, and setting the limit value as a value of the left-right difference correction torque in a case where the absolute value exceeds the limit value. This makes it possible to prevent promotion of slipping of the vehicle down the cant when the road surface cant switches, and to prevent runaway of the correction process due to accumulation of inappropriate data, for example.

The steering assistance control apparatus 10 may, in step S205, calculate the corrected steering target torque on the basis of the calculated left-right difference correction torque. The steering assistance control apparatus 10 may calculate the corrected steering target torque by substituting the calculated left-right difference correction torque into [Expression 5] given below.

(corrected steering target torque [Nm])=(steering target torque [Nm])−(left-right difference correction torque [Nm])  [Expression 5]

Thus subtracting the left-right difference correction torque from the steering target torque makes the vehicle yaw rate in a right turn based on the steering assistance control equivalent to the vehicle yaw rate in a left turn.

Thereafter, under the control of the steering assistance control apparatus 10, the electric motor 42 may allow for addition of the assistance torque and the corrected steering target torque based on the steering assistance control, thus allowing for correction of the turning path of the vehicle. The electric motor 42 may be coupled to the pinion shaft 35 via the assist transmission mechanism 41, as illustrated in FIG. 1.

After the process of step S205, the steering assistance control apparatus 10 may cause the process to return to step S201, and subsequently execute similar processes.

If the condition of "the characteristic left-right difference value is 0 (zero) or more and the steering target torque is less than 0 (zero)" is not satisfied in step S203 (S203: No), the steering assistance control apparatus 10 may cause the process to proceed to step S206.

The steering assistance control apparatus 10 may, in step S206, determine whether a condition that "the characteristic left-right difference value is less than 0 (zero) and the steering target torque is 0 (zero) or more" is satisfied at the current traveling speed and road surface cant.

"The characteristic left-right difference value being less than 0 (zero)" indicates a state in which, in a case where the same steering torque is inputted for left and right, it is more difficult for the traveling vehicle to turn in the left direction than in the right direction. "The steering target torque being 0 (zero) or more" indicates a state in which the steering assistance control is working to cause the vehicle to turn in the left direction.

This means that a state in which the condition of "the characteristic left-right difference value is less than 0 (zero) and the steering target torque is 0 (zero) or more" is satisfied is a state in which it is difficult for a turning path of the vehicle in the left direction based on the steering assistance control to reach a turning path of the vehicle assumed by the steering assistance control apparatus 10.

If the condition of "the characteristic left-right difference value is less than 0 (zero) and the steering target torque is 0 (zero) or more" is satisfied in step S206 (S206: Yes), the steering assistance control apparatus 10 may cause the process to proceed to step S207.

The steering assistance control apparatus 10 may, in step S207, calculate the left-right difference correction torque for correction of the steering target torque.

The steering assistance control apparatus 10 may acquire, from the three-dimensional map data illustrated in FIG. 3, the left steering characteristic value and the right steering characteristic value at the current traveling speed and road surface cant.

The steering assistance control apparatus 10 may calculate a left-right difference correction factor by substituting the acquired left steering characteristic value and right steering characteristic value into [Expression 6] given below.

(left-right difference correction factor)=(right steering characteristic value [(deg/s)/Nm])/(left steering characteristic value [(deg/s)/Nm])  [Expression 6]

Thereafter, the steering assistance control apparatus 10 may calculate the left-right difference correction torque. The steering assistance control apparatus 10 may calculate the left-right difference correction torque by substituting values of the calculated left-right difference correction factor and the current driver input torque, assistance torque, and steering target torque into [Expression 4] as described above.

The steering assistance control apparatus 10 may execute range limiting of comparing, for example, the absolute value of the left-right difference correction torque with a preset limit value, and setting the limit value as a value of the left-right difference correction torque in a case where the absolute value exceeds the limit value.

The steering assistance control apparatus 10 may, in step S208, calculate the corrected steering target torque on the basis of the calculated left-right difference correction torque. The steering assistance control apparatus 10 may calculate the corrected steering target torque by substituting the calculated left-right difference correction torque into [Expression 7] given below.

(corrected steering target torque [Nm])=(steering target torque [Nm])+(left-right difference correction torque [Nm])  [Expression 7]

Thus adding the left-right difference correction torque to the steering target torque makes the vehicle yaw rate in a left turn based on the steering assistance control equivalent to the vehicle yaw rate in a right turn.

Thereafter, under the control of the steering assistance control apparatus 10, the electric motor 42 illustrated in FIG. 1 may allow for addition of the assistance torque and the corrected steering target torque, thus allowing for correction of the turning path of the vehicle.

After the process of step S208, the steering assistance control apparatus 10 may cause the process to return to step S201, and subsequently execute similar processes.

If the condition of "the characteristic left-right difference value is less than 0 (zero) and the steering target torque is 0 (zero) or more" is not satisfied in step S206 (S206: No), the steering assistance control apparatus 10 may cause the process to proceed to step S209.

The steering assistance control apparatus 10 may, in step S209, set the acquired steering target torque as the corrected steering target torque as expressed by [Expression 8] given below, without calculating the left-right difference correction torque.

(corrected steering target torque [Nm])=(steering target torque [Nm])   [Expression 8]

Thus, the steering target torque may be set as the corrected steering target torque, i.e., correction of the steering target torque may not be performed, in a case where a condition of "the characteristic left-right difference value is 0 (zero) or more and the steering target torque is 0 (zero) or more" is satisfied. This case indicates a state in which, although it is more difficult for the traveling vehicle to turn in the right direction than in the left direction, the steering assistance control is working to cause the vehicle to turn in the left direction.

The steering target torque may be set as the corrected steering target torque, i.e., correction of the steering target torque may not be performed, in a case where a condition of "the characteristic left-right difference value is less than 0 (zero) and the steering target torque is less than 0 (zero)" is satisfied. This case indicates a state in which, although it is more difficult for the traveling vehicle to turn in the left direction than in the right direction, the steering assistance control is working to cause the vehicle to turn in the right direction.

Thereafter, under the control of the steering assistance control apparatus 10, the electric motor 42 illustrated in FIG. 1 may allow for addition of the assistance torque based on the driver input torque to be applied to the steering wheel 34 and the corrected steering target torque based on the steering assistance control, thus allowing for correction of the turning path of the vehicle. The corrected steering target torque in this case may be the uncorrected steering target torque based on [Expression 8] given above.

After the process of step S208, the steering assistance control apparatus 10 may cause the process to return to step S201, and subsequently execute similar processes until the steering assistance control ends.

The above-described processes performed by the steering assistance control apparatus 10 enables the example embodiment to be implemented.

The steering assistance control apparatus 10 according to one example embodiment of the technology includes the detection unit and the correction unit. The detection unit is configured to detect the road surface cant of the road on which the own vehicle is traveling. The correction unit is configured to correct the steering target torque in the steering control system, on the basis of the steering characteristic value for each of left steering and right steering and the road surface cant detected by the detection unit. The steering characteristic value indicates the steering characteristic for each combination of the traveling speed and the road surface cant. For example, see steps S202, S205, and S208 in FIG. 5.

This enables the steering assistance control to be executed on the basis of the steering characteristic value corresponding to the traveling speed and the road surface cant.

This makes it possible to reduce an occupant's feeling of strangeness about a left-right difference in the steering assistance control, i.e., the occupant's feeling of strangeness about the steering assistance control in the left and right directions. This helps to implement driving assistance control and automatic driving comfortable and secure for the occupant.

Examples of the left-right difference in the steering assistance control may include a left-right difference in an amount of departure, i.e., a left-right difference in performance, in the lane departure prevention control, wandering in the lane keep control, and a left-right difference in followability and responsiveness to a target path, i.e., a left-right difference in feel.

In the steering assistance control apparatus 10 according to one example embodiment, the steering characteristic value may include a value calculated on the basis of the traveling information within the predetermined distance traveled by the own vehicle in the past. For example, see step S104 in FIG. 2.

This enables the steering target torque to be corrected on the basis of the steering characteristic value calculated from the traveling information actually measured in the past in the own vehicle. This makes it possible to improve accuracy of the steering target torque correction.

In the steering assistance control apparatus 10 according to one example embodiment, the steering characteristic value may include a value calculated on the basis of the traveling information and subjected to averaging. The steering target torque may be corrected on the basis of the steering characteristic value subjected to the averaging. For example, see step S105 in FIG. 2.

The above averaging suppresses variations in the steering characteristic value. This makes it possible to improve the accuracy of the steering target torque correction, which helps to reduce the occupant's feeling of strangeness about the steering assistance control in the left and right directions.

In the steering assistance control apparatus 10 according to one example embodiment, the steering characteristic value may include a value calculated on the basis of the traveling information acquired in a case where the traveling speed of the own vehicle is a predetermined threshold or more. For example, see step S102 in FIG. 2.

Thus, the traveling information acquired in case where the traveling speed is too low is not reflected in the steering characteristic value.

This makes it possible to improve the accuracy of the steering target torque correction, which helps to reduce the occupant's feeling of strangeness about the steering assistance control in the left and right directions.

In the steering assistance control apparatus 10 according to one example embodiment, the steering characteristic value may include a value calculated on the basis of the traveling information acquired in a case where the steering wheel angular velocity is a predetermined threshold or less. For example, see step S102 in FIG. 2.

Thus, the traveling information acquired while the driver is performing steering different from normal driving, such as abrupt steering, is not reflected in the steering characteristic value.

This makes it possible to improve the accuracy of the steering target torque correction, which helps to reduce the occupant's feeling of strangeness about the steering assistance control in the left and right directions.

In the steering assistance control apparatus 10 according to one example embodiment, the steering characteristic value may include a value based on the driver input torque and the output torque. The output torque includes the assistance torque to be added in response to the driver input torque and the steering target torque. For example, see step S104 in FIG. 2.

This enables the steering characteristic value to be calculated on the basis of not only the driver input torque but also the output torque including the assistance torque and the steering target torque.

This makes it possible to calculate the steering characteristic value uninfluenced by a difference in steering between drivers and the activation state of the various types of steering assistance control.

Note that the effects described in the disclosure are merely illustrative and non-limiting. Any other effect may be achieved, or part of the effects described in the disclosure may be achieved.

Although some embodiments of the technology have been described in the foregoing by way of example, the technology is by no means limited to the embodiments described above. It should be appreciated that modifications and alterations may be made in accordance with a factor such as a design without departing from the technical idea of the embodiment of the technology, other than the example embodiments described above. Further, it may not be necessary to provide all of the combination of the configurations described above in the example embodiments to solve an issue.

Each of the traveling environment recognizing unit 12, the arithmetic processing unit 13, and the steering unit 14 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the traveling environment recognizing unit 12, the arithmetic processing unit 13, and the steering unit 14. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of each of the traveling environment recognizing unit 12, the arithmetic processing unit 13, and the steering unit 14 illustrated in FIG. 1.

The invention claimed is:

1. A steering assistance control apparatus to be applied to a vehicle, the steering assistance control apparatus comprising at least one processor and at least one memory storing instructions configured to cause the at least one processor to:
    detect a road surface cant of a road on which the vehicle is traveling;
    during left-steering of the vehicle, calculate a left steering characteristic value based on a yaw rate of the vehicle, driver input torque, and EPS output torque, wherein the driver input torque is torque input to a steering shaft of the vehicle by a driver operating the vehicle via a steering wheel, and the EPS output torque is torque input to the steering shaft by an electric motor of an electric power steering apparatus disposed in the vehicle;
    while the vehicle travels a predetermined distance, repeatedly calculate the left steering characteristic value and generate a first map data indicating a relationship between the calculated left steering characteristic value, a traveling speed of the vehicle at a time of calculating the left steering characteristic value, and the road surface cant at the time of calculating the left steering characteristic value;
    during right-steering of the vehicle, calculate a right steering characteristic value based on the yaw rate of the vehicle, the driver input torque, and the EPS output torque;
    while the vehicle travels the predetermined distance, repeatedly calculate the right steering characteristic value and generate a second map data indicating a relationship between the calculated right steering characteristic value, the traveling speed at a time of calculating the right steering characteristic value, and the road surface cant at the time of calculating the right steering characteristic value;
    based on the first map data and the second map data, generate a third map data indicating the relationship between a characteristic left-right difference value, the traveling speed, and the road surface cant, wherein the characteristic left-right difference value is a difference between the left steering characteristic value and the right steering characteristic value corresponding to the same traveling speed and the same road surface cant in the first map data and the second map data;
    based on the third map data, acquire an acquired characteristic left-right difference value, the acquired characteristic left-right difference value being the characteristic left-right difference value corresponding to a current traveling speed and a current road surface cant in the third map data; and
    based on the acquired characteristic left-right difference value, correct steering target torque in a steering control system.

2. The steering assistance control apparatus according to claim 1,
    wherein the yaw rate is positive value when the vehicle is turning left and is negative value when the vehicle is turning right,
    wherein the driver input torque, the EPS output torque and the steering target torque are positive values when a steering axis is turned counterclockwise when viewed from the driver and are negative when the steering axis is turned clockwise when viewed from the driver, and
    wherein the instructions are further configured to cause the at least one processor to:
        calculate the left steering characteristic value by dividing the yaw rate by a sum of the driver input torque and the EPS output torque;
        calculate the right steering characteristic value by dividing the yaw rate by the sum of the driver input torque and the EPS output torque; and
        calculate the characteristic left-right difference value by subtracting the right steering characteristic value from the left steering characteristic value.

3. The steering assistance control apparatus according to claim 2,
    wherein the instructions are further configured to cause the at least one processor to:
        determine whether the acquired current characteristic left-right difference value is greater than or equal to zero before the performance of a correction of the target steering torque;
        determine whether the steering target torque is less than zero before the performance of the correction of the target steering torque;

in response to (i) determining that the acquired current characteristic left-right difference value is greater than or equal to zero and (ii) determining that the target steering torque is less than zero, correct the target steering torque based on an acquired left steering characteristic value and an acquired right steering characteristic value, the acquired left steering characteristic value being the left steering characteristic value corresponding to the current traveling speed and the current road surface cant in the first map data, and the acquired right steering characteristic value being the right steering characteristic value corresponding to the current traveling speed and the current road surface cant in the second map data;

in response to (i) determining that the acquired current characteristic left-right difference value is not greater than or equal to zero and (ii) determining that the target steering torque is not less than zero, correct the target steering torque based on the acquired left steering characteristic value and the acquired right steering characteristic value;

in response to (i) determining that the acquired current characteristic left-right difference value is not greater than or equal to zero and (ii) determining that the target steering torque is less than zero, cancel the performance of the correction of the target steering torque; and in response to (i) determining that the acquired current characteristic left-right difference value is greater than or equal to zero and (ii) determining that the target steering torque is not less than zero, cancel the performance of the correction of the target steering torque.

4. The steering assistance control apparatus according to claim 3, wherein the instructions are further configured to cause the at least one processor to:

perform the calculating of the left steering characteristic value when the traveling speed is greater than or equal to a first predetermined threshold value; and perform the calculating of the right steering characteristic value when the traveling speed is greater than or equal to the first predetermined threshold value.

5. The steering assistance control apparatus according to claim 3, wherein the instructions are further configured to cause the at least one processor to:

perform the calculating of the left steering characteristic value when a steering wheel angular velocity is less than or equal to a second predetermined threshold value; and perform the calculating of the right steering characteristic value when the steering wheel angular velocity is less than or equal to the second predetermined threshold value.

6. The steering assistance control apparatus according to claim 3, wherein the instructions are further configured to cause the at least one processor to:

perform the calculating of the left steering characteristic value when (i) the traveling speed is greater than or equal to a first predetermined threshold value and (ii) a steering wheel angular velocity is less than or equal to a second predetermined threshold value; and perform the calculating of the right steering characteristic value when (i) the traveling speed is greater than or equal to the first predetermined threshold value and (ii) the steering wheel angular velocity is less than or equal to the second predetermined threshold value.

7. The steering assistance control apparatus according to claim 2, wherein the instructions are further configured to cause the at least one processor to:

perform the calculating of the left steering characteristic value when the traveling speed is greater than or equal to a first predetermined threshold value; and perform the calculating of the right steering characteristic value when the traveling speed is greater than or equal to the first predetermined threshold value.

8. The steering assistance control apparatus according to claim 2, wherein the instructions are further configured to cause the at least one processor to:

perform the calculating of the left steering characteristic value when a steering wheel angular velocity is less than or equal to a second predetermined threshold value; and perform the calculating of the right steering characteristic value when the steering wheel angular velocity is less than or equal to the second predetermined threshold value.

9. The steering assistance control apparatus according to claim 2, wherein the instructions are further configured to cause the at least one processor to:

perform the calculating of the left steering characteristic value when (i) the traveling speed is greater than or equal to a first predetermined threshold value and (ii) a steering wheel angular velocity is less than or equal to a second predetermined threshold value; and perform the calculating of the right steering characteristic value when (i) the traveling speed is greater than or equal to the first predetermined threshold value and (ii) the steering wheel angular velocity is less than or equal to the second predetermined threshold value.

10. The steering assistance control apparatus according to claim 1, wherein the instructions are further configured to cause the at least one processor to:

perform the calculating of the left steering characteristic value when the traveling speed is greater than or equal to a first predetermined threshold value; and perform the calculating of the right steering characteristic value when the traveling speed is greater than or equal to the first predetermined threshold value.

11. The steering assistance control apparatus according to claim 1, wherein the instructions are further configured to cause the at least one processor to:

perform the calculating of the left steering characteristic value when a steering wheel angular velocity is less than or equal to a second predetermined threshold value; and perform the calculating of the right steering characteristic value when the steering wheel angular velocity is less than or equal to the second predetermined threshold value.

12. The steering assistance control apparatus according to claim 1, wherein the instructions are further configured to cause the at least one processor to:

perform the calculating of the left steering characteristic value when (i) the traveling speed is greater than or equal to a first predetermined threshold value and (ii) a steering wheel angular velocity is less than or equal to a second predetermined threshold value; and perform the calculating of the right steering characteristic value when (i) the traveling speed is greater than or equal to the first predetermined threshold value and (ii) the steering wheel angular velocity is less than or equal to the second predetermined threshold value.

13. A steering assistance control apparatus to be applied to a vehicle, the steering assistance control apparatus comprising circuitry configured to detect a road surface cant of a road on which the vehicle is traveling, during left-steering of the vehicle, calculate a left steering characteristic value based on a yaw rate of the vehicle, driver input torque, and EPS output torque, wherein the driver input torque is torque input to a steering shaft of the vehicle by a driver operating the vehicle via a steering wheel, and the EPS output torque is torque input to the steering shaft by an electric motor of an electric power steering apparatus disposed in the vehicle;

while the vehicle travels a predetermined distance, repeatedly calculate the left steering characteristic value and generate a first map data indicating a relationship between the calculated left steering characteristic value, a traveling speed of the vehicle at a time of calculating the left steering characteristic value, and the road surface cant at the time of calculating the left steering characteristic value;

during right-steering of the vehicle, calculate a right steering characteristic value based on the yaw rate of the vehicle, the driver input torque, and the EPS output torque;

while the vehicle travels the predetermined distance, repeatedly calculate the right steering characteristic value and generate a second map data indicating a relationship between the calculated right steering characteristic value, the traveling speed at a time of calculating the right steering characteristic value, and the road surface cant at the time of calculating the right steering characteristic value;

based on the first map data and the second map data, generate a third map data indicating the relationship between a characteristic left-right difference value, the traveling speed, and the road surface cant, wherein the characteristic left-right difference value is a difference between the left steering characteristic value and the right steering characteristic value corresponding to the same traveling speed and the same road surface cant in the first map data and the second map data;

based on the third map data, acquire an acquired characteristic left-right difference value, the acquired characteristic left-right difference value being the characteristic left-right difference value corresponding to a current traveling speed and a current road surface cant in the third map data; and based on the acquired characteristic left-right difference value, correct steering target torque in a steering control system.

* * * * *